(12) United States Patent
Haas et al.

(10) Patent No.: US 8,695,763 B2
(45) Date of Patent: Apr. 15, 2014

(54) SMART MACHINE TOOL LUBRICATION SYSTEM

(75) Inventors: Gene F. Haas, Camarillo, CA (US); Kurt P. Zierhut, Camarillo, CA (US); Michael A. Teitel, Ventura, CA (US)

(73) Assignee: Haas Automation, Inc., Oxnard, CA (US)

( * ) Notice: Subject to any disclaimer, the term of this patent is extended or adjusted under 35 U.S.C. 154(b) by 588 days.

(21) Appl. No.: 12/408,200

(22) Filed: Mar. 20, 2009

(65) Prior Publication Data

US 2009/0248188 A1 Oct. 1, 2009

Related U.S. Application Data

(60) Provisional application No. 61/039,742, filed on Mar. 26, 2008.

(51) Int. Cl.
*F16N 27/00* (2006.01)

(52) U.S. Cl.
USPC ............ 184/7.4; 700/108; 700/283; 700/159; 184/6.14

(58) Field of Classification Search
USPC ............. 184/6.14, 7.4, 61; 700/108, 283, 159
See application file for complete search history.

(56) References Cited

U.S. PATENT DOCUMENTS

| | | | | |
|---|---|---|---|---|
| 3,674,112 A * | 7/1972 | Roberts | .......................... | 184/6.1 |
| 3,707,203 A * | 12/1972 | Roberts | .......................... | 184/6.4 |
| 4,326,603 A * | 4/1982 | Darrow et al. | ................. | 184/6.1 |
| 4,514,123 A | 4/1985 | Johnstone et al. | | |
| 4,674,030 A * | 6/1987 | Gabriel et al. | .................. | 700/79 |
| 5,224,051 A * | 6/1993 | Johnson | ........................ | 700/169 |
| 5,444,634 A * | 8/1995 | Goldman et al. | ............. | 700/169 |
| 5,595,462 A * | 1/1997 | Hensley | ........................ | 409/132 |
| 5,788,012 A * | 8/1998 | Yang | .............................. | 184/6.4 |
| 5,799,751 A * | 9/1998 | Winkler et al. | ............. | 184/6.14 |
| 5,921,350 A * | 7/1999 | Tsai | ................................ | 184/6.4 |
| 6,123,268 A * | 9/2000 | Chastine | .......................... | 239/1 |
| 6,498,956 B1 * | 12/2002 | Yang | .............................. | 700/14 |
| 6,884,009 B2 * | 4/2005 | Maeda | .......................... | 409/134 |
| 7,025,543 B2 * | 4/2006 | Curtis | ............................ | 409/131 |
| 2006/0053026 A1 * | 3/2006 | Boelkins | .......................... | 705/1 |
| 2008/0219781 A1 * | 9/2008 | Hyatt et al. | ..................... | 407/11 |

\* cited by examiner

*Primary Examiner* — William A Rivera
*Assistant Examiner* — Michael Riegelman
(74) *Attorney, Agent, or Firm* — McDermott Will & Emery LLP (57) ABSTRACT

A smart machine tool lubrication system monitors the distance traveled by a motion component in a machine tool. A predetermined amount of lubricant is dispensed at a lubrication point of the motion component when the monitored distance exceeds a first threshold value. The smart machine tool lubrication system may further monitor the duration of time the motion component is in motion and dispense the predetermined amount of lubricant with the monitored duration of time exceeds a second threshold value.

24 Claims, 6 Drawing Sheets

SMART MACHINE TOOL LUBRICATION SYSTEM

This application claims the benefit of U.S. Provisional Application No. 61/039,742, filed Mar. 26, 2008, which is hereby incorporated by reference herein.

FIELD

The invention relates to machine tools and, in particular, concerns a smart lubrication system for lubricating the motion components of a machine tool.

BACKGROUND

Machine tools allow an operator to fabricate products by shaping a workpiece using one or more cutting tools. Computer numerical control ("CNC") machine tools automate the fabrication process by controlling the relative positions of the workpiece and the cutting tools, as well as the operation of the cutting tools, in accordance with instruction sequences in user programs. In this manner, CNC machine tools are capable of fabricating multiple instances of the same product with little or no variation between the products. CNC machine tools use a number of movable or motion components to position both the workpiece and the cutting tools during the fabrication process. The motion components require lubrication in order to maintain operability and prevent excessive wear of the CNC machine tool.

Proper lubrication of motion components is critical to the efficient operation of CNC machine tools. Applying too little lubricant to the motion components may result in the premature wear and early failure of the components. Applying too much lubricant to the motion components increases operating costs due to the larger amounts of lubricant being applied and the extra maintenance required to remove excess lubricant from the CNC machine tool. In addition, the excess lubricant may contaminate and/or prevent the proper operation of other parts of the CNC machine tool. For example, excess lubricant leaked from the motion components may contaminate the cutting fluid used as coolant when shaping a workpiece.

SUMMARY

The invention addresses the foregoing issues by providing a smart machine tool lubrication system that dispenses appropriate amounts of lubricant to motion components of a CNC machine tool. This novel system monitors the actual activity of the motion components to determine when to dispense a specific amount of lubricant. The levels of activity that trigger the dispensing of the lubricant and the specific amount of lubricant dispensed are programmable by an operator, thereby allowing the system to be configured for different environments and for different CNC machine tools.

According to one embodiment, a method for lubricating motion components of a machine tool is described. The method includes the steps of monitoring a distance traveled by a motion component of the machine tool and dispensing a predetermined amount of lubricant at a lubrication point of the motion component when the monitored distance exceeds a threshold value.

According to another embodiment, a computer-readable medium containing computer-executable instructions for implementing a method for lubricating motion components of a machine tool is provided. The implemented method includes the steps of monitoring a distance traveled by a motion component of the machine tool and dispensing a predetermined amount of lubricant at a lubrication point of the motion component when the monitored distance exceeds a threshold value.

According to another embodiment a machine tool lubrication control system is described. The control system includes a processor configured to monitor a distance traveled by a motion component of a machine tool and dispense a predetermined amount of lubricant at a lubrication point of the motion component when the monitored distance exceeds a threshold value.

According to another embodiment a machine tool lubrication system is described. The machine tool lubrication system includes a delivery system configured to dispense lubricant at a lubrication point of a motion component of a machine tool. The machine tool lubrication system further includes a control system configured to monitor a distance traveled by the motion component of the machine tool and to signal the delivery system to dispense a predetermined amount of the lubricant at the lubrication point of the motion component when the monitored distance exceeds a threshold value.

The foregoing summary of the invention has been provided so that the nature of the invention can be understood quickly. A more detailed and complete understanding of the preferred embodiments of the invention can be obtained by reference to the following description of the invention together with the associated drawings.

DETAILED DESCRIPTION

The detailed description set forth below in connection with the associated drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without all of the specific details contained herein. In some instances, well known structures and components are described in general and may be shown in block diagram form in order to avoid obscuring the concepts of the invention.

Figure 1:
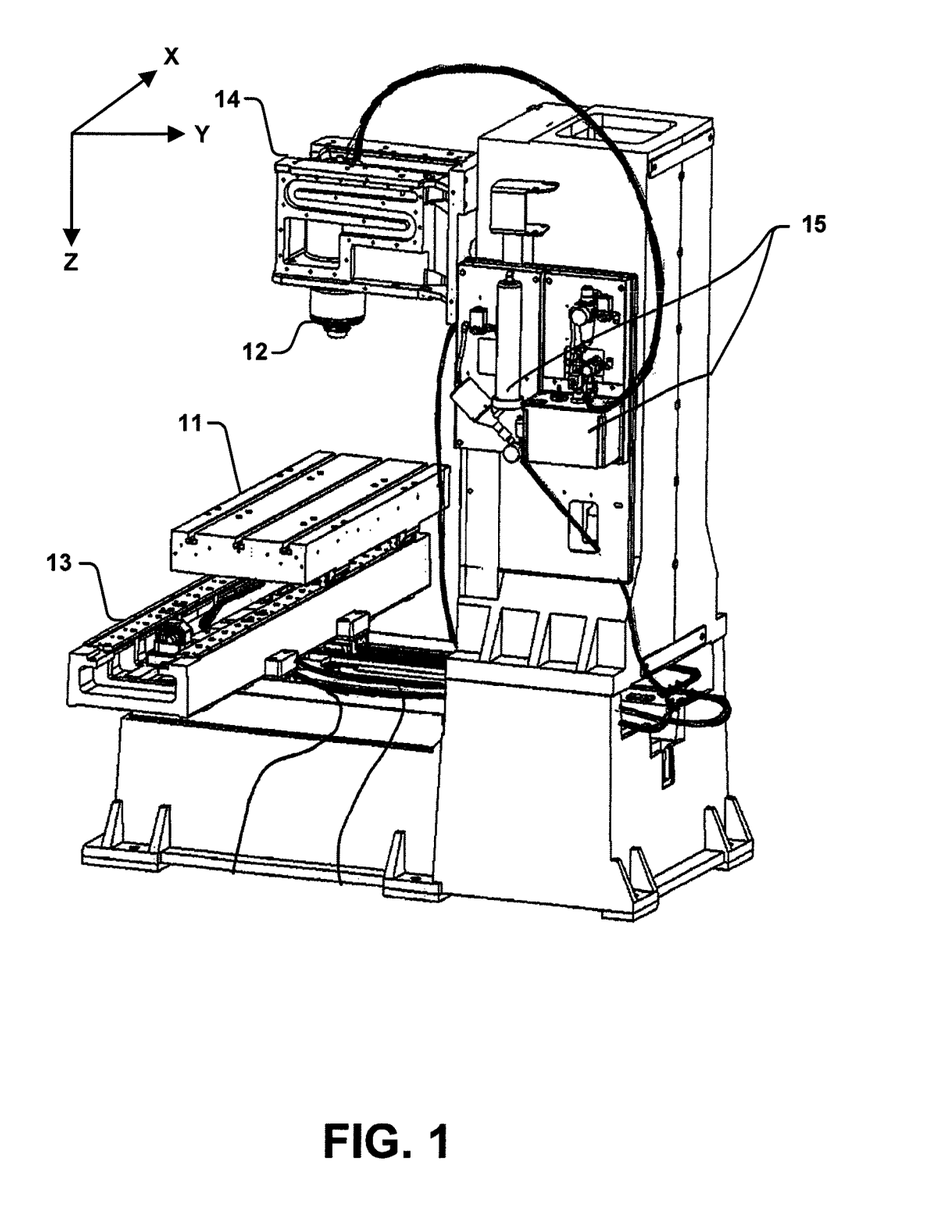
FIG. 1 is a perspective drawing of portions of a machine tool according to one embodiment of the invention.

FIG. 1 is a perspective drawing of portions of a machine tool 10 that will be referenced to describe the operation of various embodiments of a machine tool lubrication system. Machine tool 10 includes a table 11 and a spindle 12. Table 11 is configured to temporarily hold a workpiece (not shown) during processing by machine tool 10. The workpiece may be mounted directly on table 11 or on an intermediate structure such as a pallet that is mounted on table 11. Spindle 12 is configured to hold and rotate an interchangeable cutting tool (not shown). The shape of the cutting tool and the rotational speed of spindle 12 affect the cutting behavior of machine tool 10 for shaping the workpiece.

Machine tool 10 represents a 3-axis machine tool. Specifically, the relative positions of a workpiece mounted on table 11 and a cutting tool held in spindle 12 are variable along three axes of motion, represented by arrows X, Y and Z shown in FIG. 1. For example, table 11 is configured to slide along the X axis of motion. Support structure 13, to which table 11 is slidably attached, is configured to slide along the Y axis of motion. Spindle 12 is attached to support structure 14 and is configured to rotate around the Z axis of motion. In addition, support structure 14 is configured to slide spindle 12 along the Z axis of motion. Table 11, spindle 12 and support structures 13 and 14 are generally referred to as motion components since they move with respect to the overall structure of machine tool 10.

Those skilled in the art will recognize that the invention is applicable to machine tools having configurations different from that represented in FIG. 1. For example, there may be a different number of axes of motion, the spindle may rotate around a different axis, etc.

The motion components rely on a number of different mechanisms to effect their movement during the processing of a workpiece. For example, table 11 and support structures 13 and 14 may be mounted on linear guides and driven along their respective axes of motion by driving mechanisms such as ball screws. The rotation of spindle 12 may be effected using gears, belts or driven directly by a motor. Those skilled in the art will recognize a number of alternative mechanisms besides those mentioned above that may be used to facilitate movement of the motion components along the axes of motion. It is noted that the invention is not limited to any particular type of mechanism for moving the motion components.

Mechanisms used to effect movement of the motion components typically include moving parts that come into contact with each other. For example, bearings are in contact with guides and a ball nut is in contact with the threads of a ball screw mechanism. Lubrication at the points of contact between these components is necessary to prevent unnecessary wear of the mechanisms and possible early failure of the motion components in machine tool 10. Lubrication may be provided using any of a number of known lubricants, such as different types of grease or oil.

Machine tool 10 depicted in FIG. 1 includes lubrication delivery system 15 configured to dispense one or more lubricants to lubrication points of the motion components. The lubrication points are parts of the motion components and their respective mechanisms for effecting movement that are configured to receive a dispensed lubricant. For example, lubrication delivery system 15 includes a mechanism for delivering grease to the lubrication points of table 11 and support structures 13 and 14. Similarly, lubrication delivery system 15 includes a mechanism for delivering oil, or an air-oil mixture, to spindle 12. The pumps, valves, pressure switches, hoses, connectors and nozzles commonly used in lubrication delivery systems are well known to those skilled in the art and will not be described in detail herein. It is noted that the invention is not limited to any particular type of lubrication delivery system.

Figure 2:
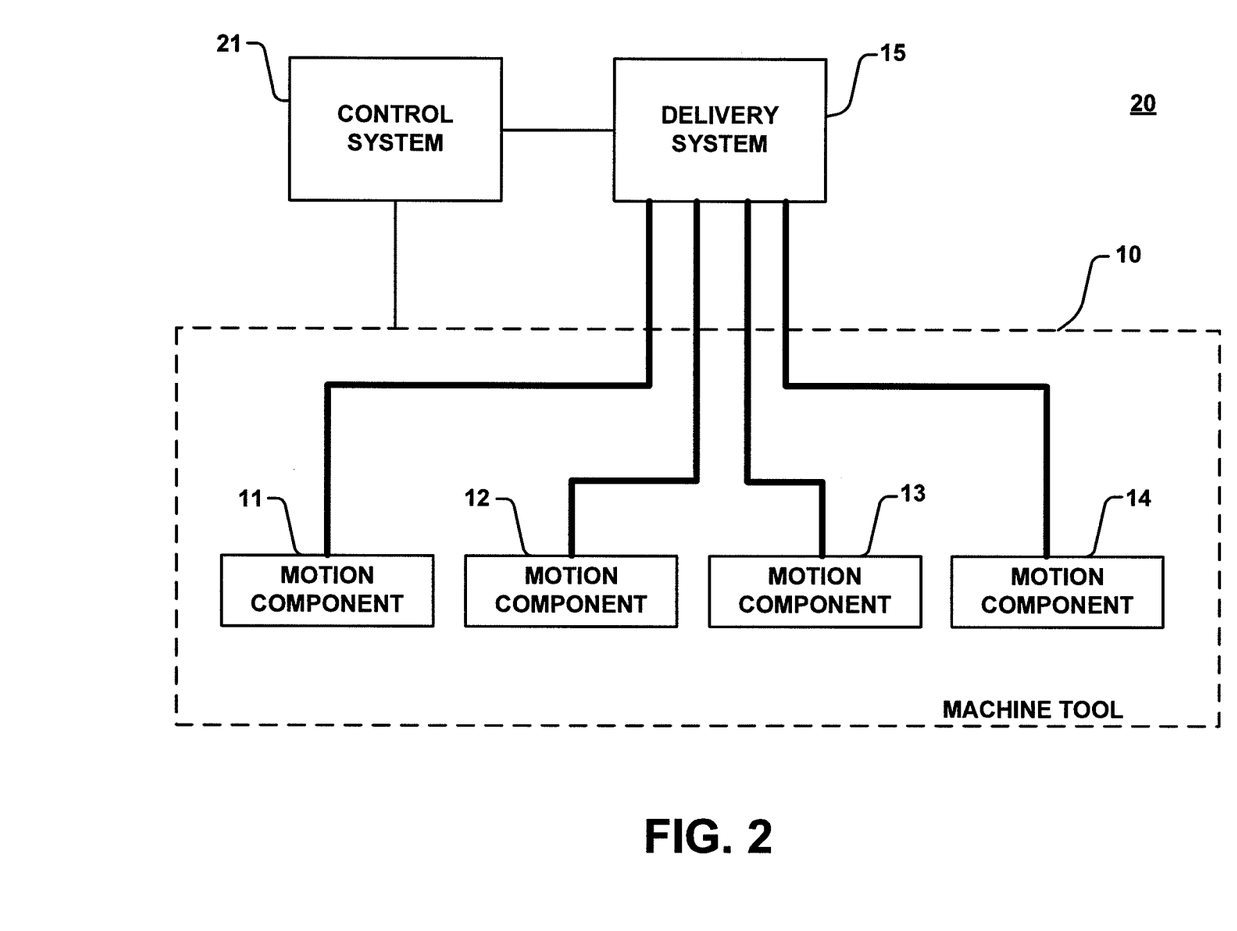
FIG. 2 is a block diagram depicting components of a CNC machine tool according to one embodiment of the invention.

FIG. 2 is a block diagram depicting components of a CNC machine tool 20 according to one embodiment of the invention. As shown in FIG. 2, CNC machine tool 20 includes machine tool 10 and lubricant delivery system 15, examples of which were described above in connection with FIG. 1. Machine tool 10 is depicted with four motion components that correspond to table 11, spindle 12 and support structures 13 and 14 in this example. CNC machine tool 20 further includes control system 21 for controlling the operation of machine tool 10 and lubricant delivery system 15.

Figure 3:
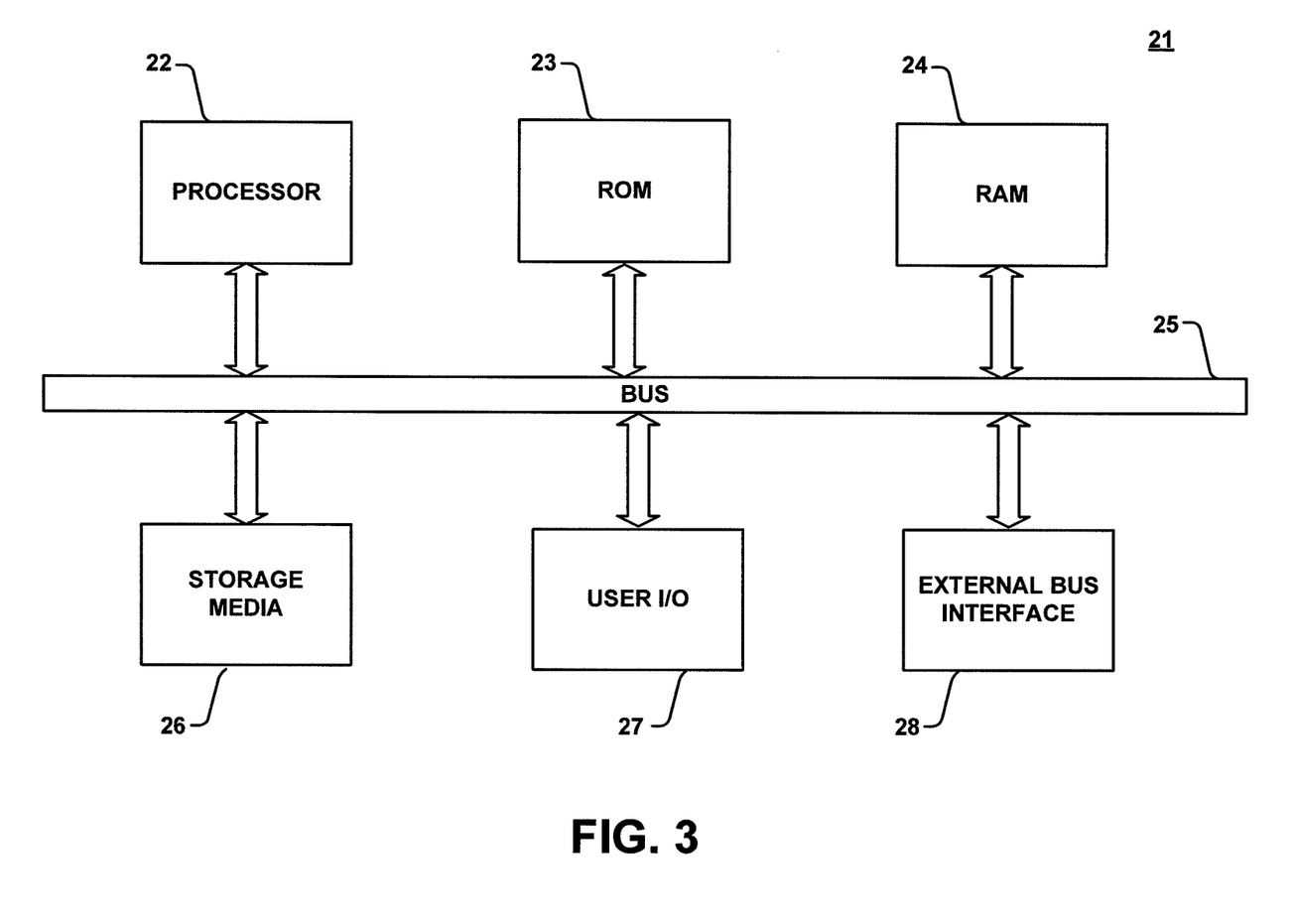
FIG. 3 is a block diagram depicting components of control system according to one embodiment of the invention.

FIG. 3 is a block diagram depicting components of control system 21 according to one embodiment of the invention. Control system 21 includes processor 22, read-only memory ("ROM") 23, random-access memory ("RAM") 24, storage media 26, user input/output ("I/O") 27 and external bus interface 28, each of which are coupled to bus 25.

Processor 22 is configured to execute sequences of instructions to implement a machine tool lubrication system for lubricating motion components of machine tool 10. Processor 22 also executes sequences of instructions to implement a general operating program which manages the resources of control system 21 and facilitates communication between control system 21 and machine tool 10 and lubrication delivery system 15. Processor 22 also is configured to execute sequences of instructions from one or more user programs, which include step-by-step instructions programmed by an operator to control machine tool 10 to shape a workpiece into a desired product. Processor 22 may be a general-purpose microprocessor, a microcontroller, a Digital Signal Processor ("DSP"), an Application Specific Integrated Circuit ("ASIC"), a Field Programmable Gate Array ("FPGA"), a Programmable Logic Device ("PLD"), a controller, a state machine, gated logic, discrete hardware components, or any other suitable component(s) that can perform calculations or other manipulations of information necessary to execute sequences of instructions.

ROM 23 is a non-volatile storage device that stores static instruction sequences such as a basic input/output system ("BIOS") executed by processor 22 at start-up to initiate operation of control system 21. RAM 24 is a volatile storage device that temporarily stores information and instruction sequences to be executed by processor 22. Storage media 26 represents a non-volatile storage device for storing information and instruction sequences. Storage media 26 may include magnetic media (e.g., floppy disks, hard disks, magnetic tape, etc.), optical media (e.g., CD, DVD, etc.) or electronic media (e.g., Flash memory, PROM, EPROM, EEPROM, etc.). Each of these types of storage devices represents an example of computer-readable media that is suitable for storing computer-executable instructions.

User I/O 27 represents one or more user interfaces configured to communicate information between an operator and control system 21. Exemplary user interface devices include display devices, keyboards, cursor control devices, jog handles, etc. Using these devices, an operator is able to monitor and manually control the operation of machine tool 10, create, select and edit user programs for execution, enter and modify operating parameters, etc.

External bus interface 28 facilitates the communication of information and control signals between control system 21, lubricant delivery system 15 and machine tool 10 using one or more external buses. For example, information on the status of various components in machine tool 10 and lubrication delivery system 15 may be communicated to control system 21 and displayed for an operator or for use in the operating or user programs. Additionally, control system 21 sends control signals to components in machine tool 10 and lubrication delivery system 15 during execution of the operating program and user programs.

As represented in FIG. 3, the components of control system 21 are each coupled to bus 25. Bus 25 represents one or more buses for communicating information and instructions between the components of control system 21. Control system 21 is not limited to a configuration in which all components are coupled directly to a single bus. Alternative arrangements may include multiple buses linked by other components. It is further noted that control system 21 may include other components besides those depicted in FIG. 3. For example, control system 21 may include a network interface for coupling control system 21 to an external network.

Returning to FIG. 2, each of motion components 11 to 14 is depicted with an individual connection to lubricant delivery system 15. Using this arrangement, a different lubricant can be dispensed to the lubrication points of each motion component. For example, grease can be dispensed to motion components 11 to 13 and oil, or an oil-air mixture, dispensed to motion component 14. The invention is not limited to this arrangement for dispensing lubricant to the motion components. Alternative configurations may use a single supply line from delivery system 15 to machine tool 10 and split the supply line to each of the motion components within machine tool 10. Other configurations of delivery system 15 may use a combination of individual supply lines for respective motion components and shared supply lines, that are split within machine tool 10 for other motion components. In addition, different numbers of motion components may exist in different machine tools depending on the number of axes of motion and the type of machine tool.

Figure 4:
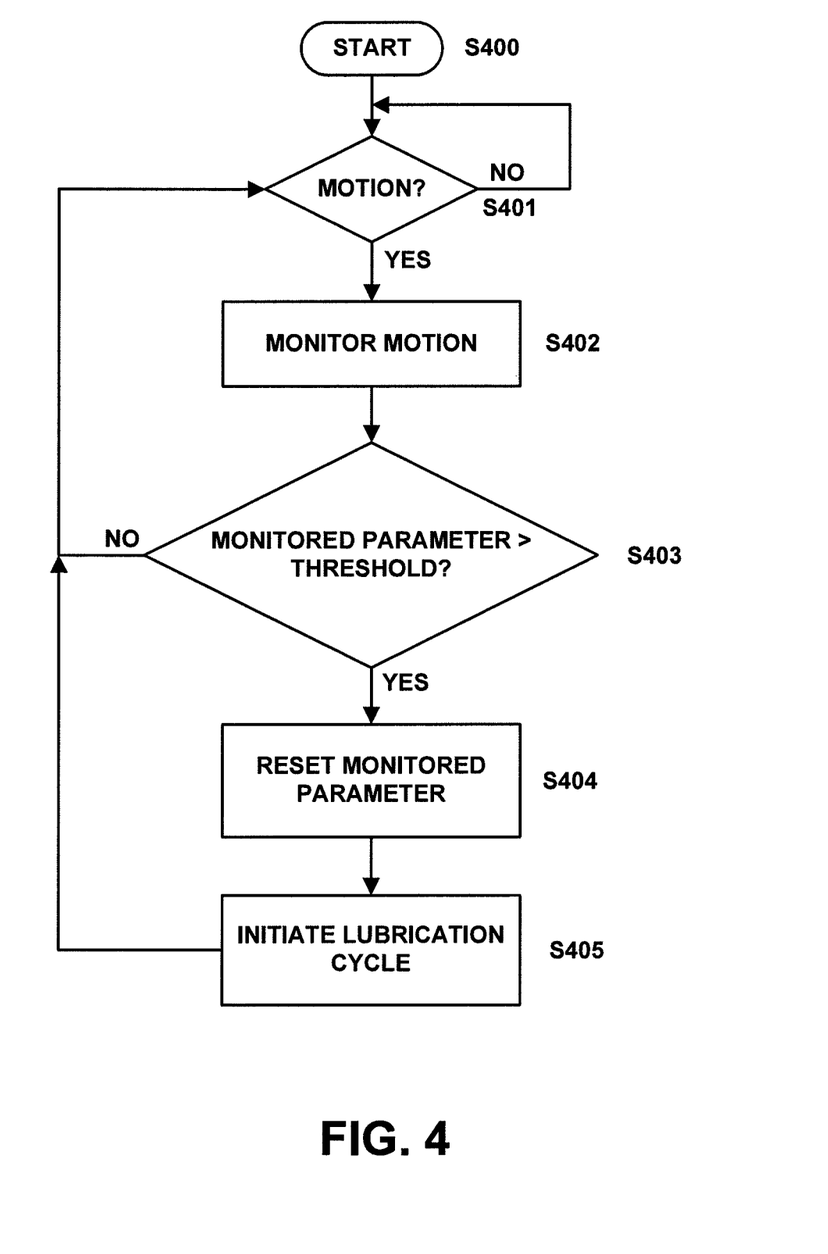
FIG. 4 is a flowchart depicting steps within a control loop for lubricating motion components of a machine tool according to one embodiment of the invention.

FIG. 4 is a flowchart depicting steps within a control loop for lubricating motion components of a machine tool according to one embodiment of the invention. The control loop is implemented by processor 22 executing one or more sequences of instructions within control system 21. The control loop operates within the general operating program to control lubrication of the motion components within machine tool 10 both during manual operation of machine tool 10 by an operator and during the execution of user programs. The control loop is initialized in step S400 along with the general operating program at start-up of control system 21.

In step S401, it is determined whether any of the motion components within machine tool 10 are moving along their respective axes of motion. The movement of one or more of the motion components may be caused by a manual command entered by an operator or by the execution of an instruction within a user program. Step S401 loops until one of the motion components is instructed by control system 21 to move.

Once a motion component is instructed to move by control system 21, the control loop proceeds to steps S402 and S403. In step S402, the motion is monitored and, in particular, the distance or length of the motion is monitored. For example, if table 11 is instructed to move a specified distance along the X-axis, the distance traveled by table 11 is determined by control system 21. Alternatively, the distance traveled may be based on a number of rotations of spindle 12 around the Z-axis. The distance traveled by spindle 12 may be determined by providing the rate of rotation and the duration of rotation to an integrator. The distance traveled by each motion component is monitored and accumulated by control system 21 independent of the other motion components. The monitored distances for each motion component are reset when the control loop is initialized in step S400 and accumulated as the control loop executes during operation of CNC machine tool 20.

In step S403, the accumulated distances are compared against threshold parameter values set for the respective motion components. If none of the accumulated distances exceeds their respective threshold parameter value, the control loop returns to step S401 to await the next movement by a motion component. Alternatively, if any of the accumulated distances exceeds their respective threshold parameter value, the control loop proceeds to step S404.

According to one embodiment of the invention, the duration of time the motion component is in motion is monitored in addition to the distance traveled. For example, the duration of time a rotation motion component, such as spindle 12, is rotating is accumulated as a monitored value in addition to the distance traveled represented by the number of rotations. As with the accumulated distance traveled, the accumulated duration of motion is compared against a threshold parameter value in step S403 and the control loop returns to step S401 if the accumulated duration does not exceed the threshold parameter value or proceeds to step S404 if the accumulated duration exceeds the threshold parameter value.

In step S404, the accumulated value of the monitored parameter that was determined to have exceeded the corresponding threshold parameter value in step S403 is reset and a lubrication cycle is initiated in step S405. The lubrication cycle dispenses a predetermined amount of lubricant at a lubrication point of the motion component corresponding to the monitored parameter value that exceeded the threshold parameter value. For example, if the motion of table 11 along the X-axis during operation of machine tool 10 causes the total distance traveled by table 11 to exceed the associated threshold parameter value, the accumulated distance traveled monitored for table 11 is reset and control system 21 causes delivery system 15 to dispense a predetermined amount of lubricant at the lubrication point or points of table 11. The lubrication cycle will be described in more detail below in connection with FIGS. 5 and 6. Once the lubrication cycle has completed, the control loop returns to step S401 to wait for the next motion component to be instructed to move.

Depending on the configuration of delivery system 15, lubricant may be dispensed to more than one motion component during a lubrication cycle. For example, delivery system 15 may be configured to dispense grease to the lubrication points of table 11 and support structures 13 and 14 simultaneously. With this arrangement, when the monitored distance traveled by any one of these motion components exceeds their respective threshold parameter value, the accumulated values for the distances traveled for each of these motion components is reset in step S404 and the lubrication cycle is initiated in step S405 to dispense a predetermined amount of lubricant to the lubrication points of each motion component. The invention is not limited to any particular configuration of delivery system 15 with respect to the number of motion components that are lubricated in any given lubrication cycle.

Figure 5:
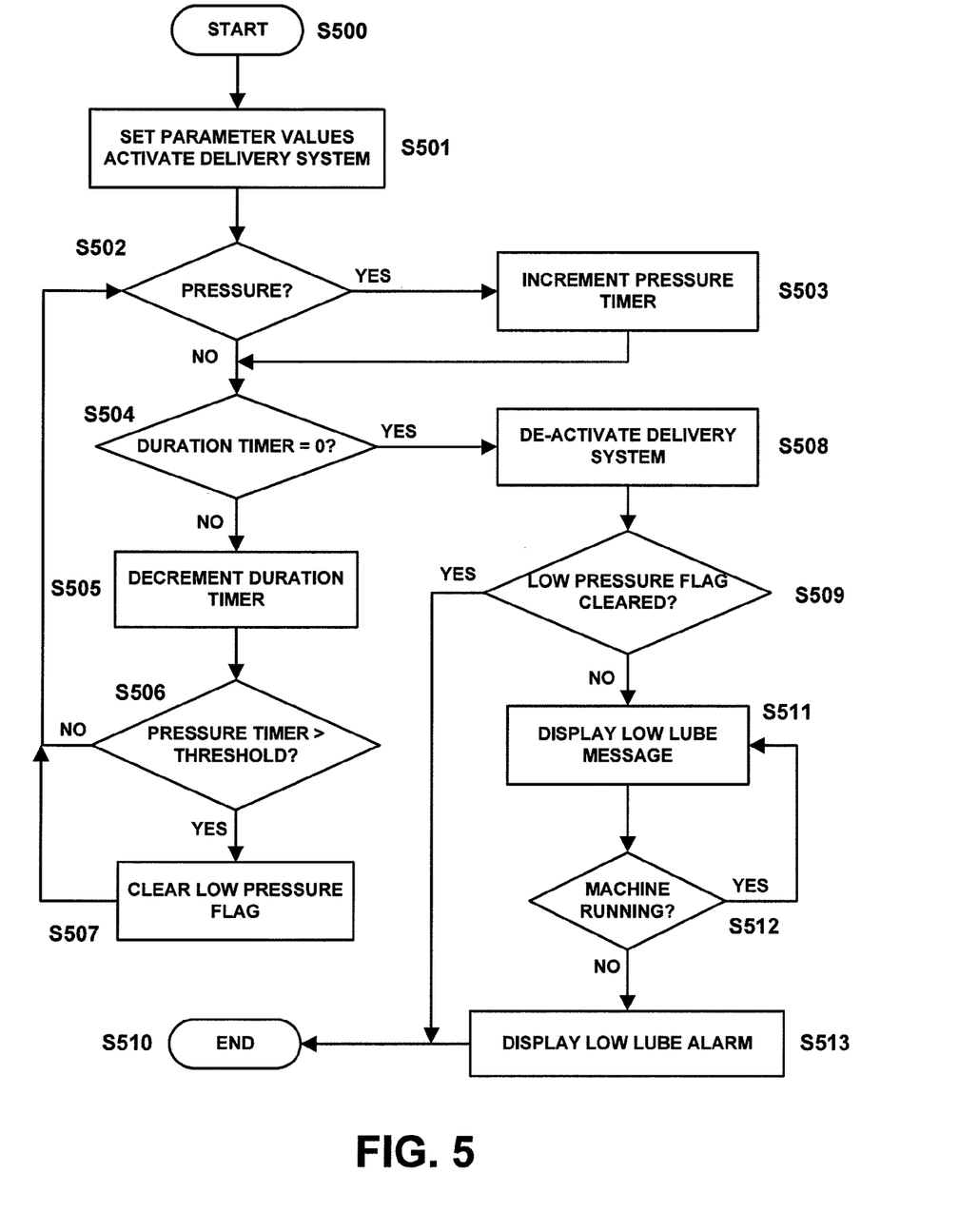
FIG. 5 is a flowchart depicting steps in a lubrication cycle according to one embodiment of the invention.

FIG. 5 is a flowchart depicting steps in a lubrication cycle for dispensing lubricant to motion components that travel in a linear manner along one of the axes of motion according to one embodiment of the invention. The lubrication cycle is initiated in step S500 by processor 22 in control system 21 executing of a sequence of instructions for implementing the lubrication cycle. In accordance with the executed instructions, control system 21 sends control signals to delivery system 15 to effect the dispensing of predetermined amounts of lubricant on the lubrication points of the motion component being lubricated.

In step S501, parameter values associated with the lubrication cycle are set and delivery system 15 is activated. According to one embodiment, the parameter values include a duration timer, a pressure timer, a pressure threshold and a low pressure flag. The duration timer is set for a period of time determined to be necessary to dispense the predetermined amount of lubricant to the motion component. The low pressure flag is set and the pressure timer is reset to zero. Once all of the parameter values have been set, control system 21 activates delivery system 15 to begin dispensing lubricant. For example, a pump used to pressurize delivery system 15 to dispense lubricant along one or more supply lines is turned on in step S501.

In step S502 the pressure in delivery system 15 is monitored and compared against a threshold value. If the monitored pressure is greater than the threshold value, the process proceeds to step S503 where the pressure timer is decremented. If the monitored pressure is not greater than the threshold value, the process proceeds to step S504 where it is determined whether the duration timer has expired. If the duration timer has not expired, the duration timer is decremented in step S505 and the pressure timer is monitored to determine if it has exceeded a threshold value in step S506. If the pressure timer has not exceeded the threshold value, the process returns to step S502 where the pressure in delivery system 15 is monitored and compared against a threshold value. If the pressure timer has exceeded the threshold value, the low pressure flag set when the lubrication cycle was initialized is cleared in step S507 and the process returns to step S502.

Returning to step S504, if it is determined that the duration timer has expired, delivery system 15 is de-activated in step S508. For example, the pump used to pressurize delivery system 15 is turned off. The process then proceeds to step S509 where it is determined if the low pressure flag has been cleared. If the low pressure flag has been cleared, the lubrication cycle ends at step S510. If the low pressure flag has not been cleared, control system 21 displays a low lube message in step S511 warning an operator that the level of lubricant available in delivery system 15 is low. If CNC machine tool 20 is still running in step S512, control system 21 keeps displaying the low lube message for the operator. Once CNC machine tool 20 has stopped running, the process proceeds to step S513 where control system 21 displays a low lube alarm to warn the operator that lubricant needs to be added to delivery system 15 prior to the next operational run of CNC machine tool 20.

Figure 6:
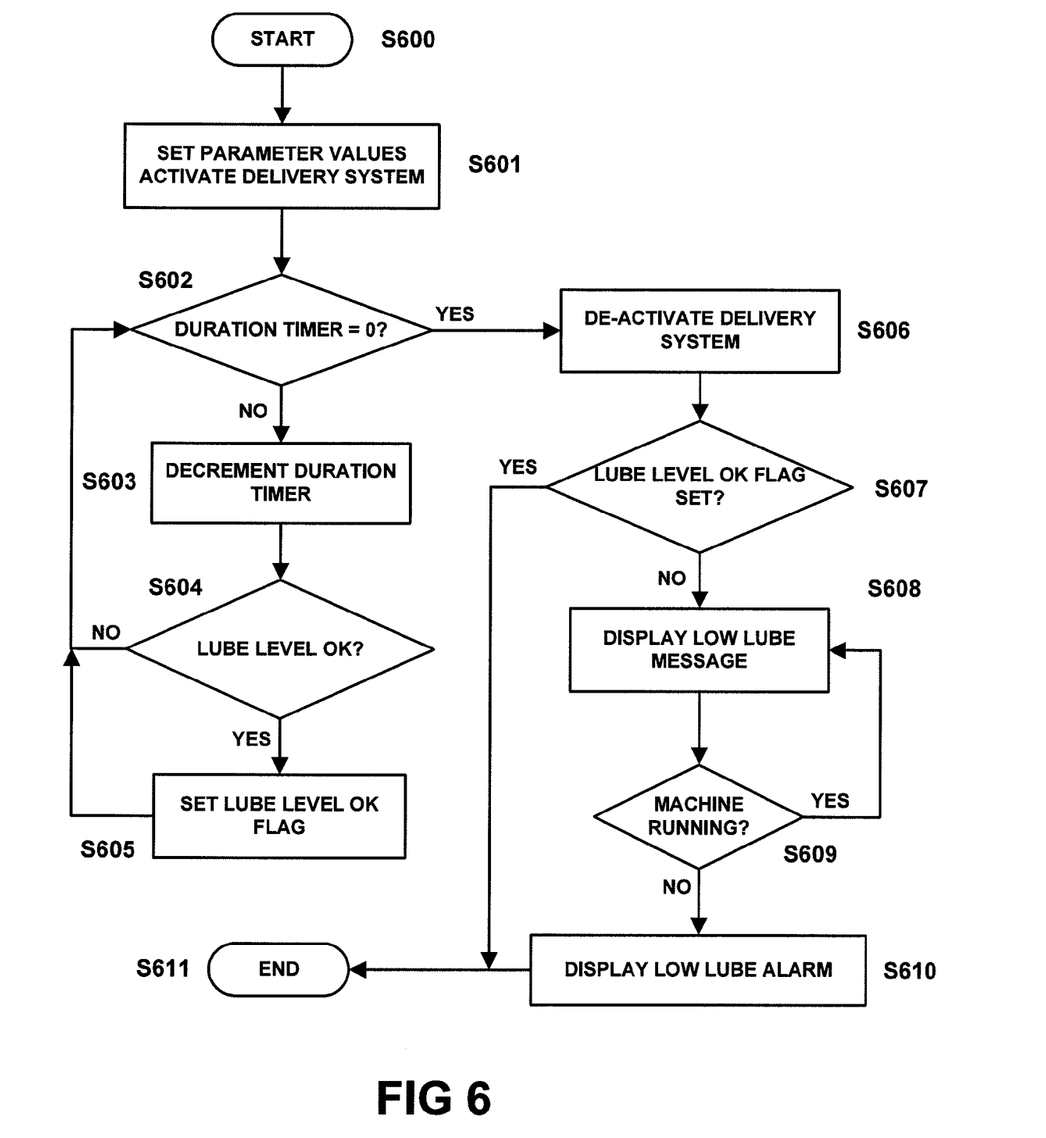
FIG. 6 is a flowchart depicting steps in a lubrication cycle according to another embodiment of the invention.

FIG. 6 is a flowchart depicting steps in a lubrication cycle used to dispense a predetermined amount of lubricant to a motion component having a rotational movement around an axis of motion, such as spindle 12. For these types of motion components, the lubricant is typically oil or an oil-air mixture. The lubrication cycle is initiated in step S600 by processor 22 in control system 21 executing of a sequence of instructions for implementing the lubrication cycle. In accordance with the executed instructions, control system 21 sends control signals to delivery system 15 to effect the dispensing of predetermined amounts of lubricant on the lubrication points of the motion component being lubricated.

In step S601, parameter values associated with the lubrication cycle are set and delivery system 15 is activated. According to one embodiment, the parameter values include a duration timer, a lube level OK flag, and a lube level threshold value. The duration timer is set for a period of time determined to be necessary to dispense the predetermined amount of lubricant to the motion component and the lube level OK flag is cleared. Once all of the parameter values have been set, control system 21 activates delivery system 15 to begin dispensing lubricant. For example, a pump used to pressurize delivery system 15 to dispense lubricant along one or more supply lines is turned on in step S601.

In step S602, it is determined whether the duration timer has expired. If the duration timer has not expired, the process continues to step S603 where the duration timer is decremented. In step S604, the lube level of the lubricant stored within delivery system 15 is compared against a threshold value. If the lube level is not greater than the threshold value, the process returns to step S602 where it is determined whether the duration timer has expired. If the lube level is greater than the threshold value, the lube level OK flag is set in step S605 before the process returns to step S602.

If it is determined in step S602 that the duration timer has expired, the process proceeds to step S606 where delivery system 15 is de-activated by control system 21. In step S607 it is determined if the lube level OK flag is set. If the lube level OK flag is set, the process proceeds to step S611 where the lubrication cycle concludes. If the lube level OK flag has not been set, the process proceeds to step S608 where a low lube message is displayed by control system 21 to communicate the condition to an operator. In step S609, it is determined if CNC machine tool 20 is still running. If CNC machine tool 20 is still running, the low lube message continues to be displayed by control system 21. If CNC machine tool 20 is not running, a low lube alarm is displayed by control system 21 warning the user of the low lubricant levels prior to executing another operational run.

According to one embodiment of the invention, lubricant is dispensed to the lubrication points of the motion components prior to start of operation of machine tool 10. The lubricant may be dispensed to all motion components at the same time or, alternatively, lubricant may be dispensed to each motion component prior to executing a first instruction for movement of the motion component either from manual control by an operator or from a user program. Alternative embodiments of the invention, may check the monitored distance traveled and/or duration of time in motion for each motion component from the previous operating session of machine tool 10 to determine whether lubricant should be dispensed at the beginning of the next operating session.

As described above, a number of different threshold parameter values may be used in connection with the control loop depicted in FIG. 4 as well as the lubrication cycles depicted in FIGS. 5 and 6. The threshold parameter values may be user defined so that an operator can select threshold parameter values suitable for different types of motion components, different types and amounts of lubricant, different operating environments, etc. For example, an operator may increase the threshold parameter values associated with the distance traveled by the motion component or the duration of time in motion if the lubricant being dispensed has a longer useful life than a previously used lubricant. The operator-selected threshold parameter values are stored within control system 21 for use during execution of the control loop and lubrication cycles used to implement the machine tool lubrication system.

The foregoing description of embodiments of the invention describes a smart machine tool lubrication system that controls the dispensing of lubricant to motion components of a machine tool based on the actual activity of the motion components monitored by controls system 21. Unlike manual lubrication systems, which may result in either under lubrication or over lubrication, or lubrication systems that simply lubricate the motion components at fixed time intervals regardless of activity levels, which often result in over lubrication and contamination of other components within the machine tool, the invention applies a smart control algorithm to efficiently dispense lubricant to the motion components of a machine tool.

The foregoing description is provided to enable one skilled in the art to practice the various embodiments of the invention described herein. Various modifications to these embodiments will be readily apparent to those skilled in the art, and generic principles defined herein may be applied to other embodiments. Thus, the following claims are not intended to be limited to the embodiments of the invention shown and described herein, but are to be accorded the full scope consistent with the language of the claims. All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for lubricating motion components of a machine tool, comprising the steps of:
    automatically monitoring a linear distance traveled by each of a plurality of motion components of the machine tool, wherein the travel for each motion component is movement along a respective one of plural axes, and wherein a lubrication delivery system of the machine tool includes a separate connection to each of the plurality of motion components;
    determining that the monitored linear distance exceeds a first threshold value for at least one of the plurality of motion components; and
    dispensing, in response to the determination, a predetermined amount of lubricant at a lubrication point of the at least one motion component, via the separate connection of the at least one motion component to the lubricant delivery system.

2. The method for lubricating motion components of a machine tool according to claim 1, further comprising the steps of:
    monitoring a duration of time that each of the plurality of motion components is in motion;
    determining that the monitored duration exceeds a second threshold value for another one of the plurality of motion components; and
    dispensing, in response to the determination that the monitored duration exceeds the second threshold value, the predetermined amount of lubricant at the lubrication point of the other one motion component, via the separate connection of the other one motion component to the lubricant delivery system.

3. The method for lubricating motion components of a machine tool according to claim 2, wherein the monitored duration of time is reset and said monitoring, determining and dispensing steps are repeated when the predetermined amount of lubricant is dispensed at the lubrication point of the other one motion component.

4. The method for lubricating motion components of a machine tool according to claim 1, wherein the monitored distance is reset and said monitoring, determining and dispensing steps are repeated when the predetermined amount of lubricant is dispensed at the lubrication point of the one motion component.

5. The method for lubricating motion components of a machine tool according to claim 1, wherein the first threshold value and the predetermined amount of lubricant are user defined.

6. The method for lubricating motion components of a machine tool according to claim 1, wherein the travel of the one motion component includes movement controlled by a user program.

7. The method for lubricating motion components of a machine tool according to claim 6, wherein the travel of the one motion component further includes movement controlled by real time user input.

8. The method of claim 1, wherein the separate connection to each of the plurality of motion components corresponds to a different lubricant.

9. The method of claim 1, wherein the separate connection to each of the plurality of motion components corresponds to a split portion of a shared supply line.

10. The method of claim 1, wherein the plurality of motion components comprise two or more of a table, a spindle, and first support structure and a second support structure.

11. A computer-readable storage medium containing computer-executable instructions for implementing a method for lubricating motion components of a machine tool, the method comprising the steps of:
    automatically monitoring a linear distance traveled by each of a plurality of motion components of the machine tool, wherein the travel for each motion component is movement along a respective one of plural axes, and wherein a lubrication delivery system of the machine tool includes a separate connection to each of the plurality of motion components;
    determining that the monitored linear distance exceeds a first threshold value for at least one of the plurality of motion components; and
    dispensing, in response to the determination, a predetermined amount of lubricant at a lubrication point of the at least one motion component, via the separate connection of the at least one motion component to the lubricant delivery system.

12. The computer-readable storage medium according to claim 11, the method further comprising the steps of:
    monitoring a duration of time that each of the plurality of motion components is in motion;
    determining that the monitored duration exceeds a second threshold value for another one of the plurality of motion components; and
    dispensing, in response to the determination that the monitored duration exceeds the second threshold value, the predetermined amount of lubricant at the lubrication point of the other one motion component, via the separate connection of the one motion component to the lubricant delivery system.

13. The computer-readable storage medium according to claim 12, wherein the monitored duration of time is reset and said monitoring, determining and dispensing steps are repeated when the predetermined amount of lubricant is dispensed at the lubrication point of the other one motion component.

14. The computer-readable storage medium according to claim 11, wherein the monitored distance is reset and said monitoring, determining and dispensing steps are repeated when the predetermined amount of lubricant is dispensed at the lubrication point of the one motion component.

15. The computer-readable storage medium according to claim 11, wherein the first threshold value and the predetermined amount of lubricant are user defined.

16. The computer-readable storage medium according to claim 11, wherein the travel of the one motion component includes movement controlled by a user program.

17. The computer-readable storage medium according to claim 16, wherein the travel of the one motion component further includes movement controlled by real time user input.

18. A machine tool lubrication system, comprising:
a delivery system configured to dispense lubricant at respective lubrication points for a plurality of motion components of a machine tool, wherein the delivery system includes a separate connection to each of the plurality of motion components of the machine tool; and
a control system configured to:
   automatically monitor a linear distance traveled by each of a plurality of motion components of the machine tool, wherein the travel for each motion component is movement along a respective one of plural axes,
   determine that the monitored linear distance exceeds a first threshold value for at least one of the plurality of motion components, and
   signal, in response to the determination, said delivery system to dispense a predetermined amount of the lubricant at the respective lubrication point of the at least one motion component, via the separate connection of the at least one motion component to the delivery system.

19. The machine tool lubrication system according to claim 18, wherein said control system is further configured to:
monitor a duration of time that each of the plurality of motion components is in motion;
determine that the monitored duration exceeds a second threshold value for another one of the plurality of motion components; and
signal, in response to the determination that the monitored duration exceeds the second threshold value, said delivery system to dispense the predetermined amount of lubricant at the lubrication point of the other one motion component, via the separate connection of the other one motion component to the lubricant delivery system.

20. The machine tool lubrication system according to claim 19, wherein said control system is further configured to reset the monitored duration of time and repeat the monitoring, determining and signaling steps when the predetermined amount of lubricant is dispensed at the lubrication point of the other one motion component.

21. The machine tool lubrication system according to claim 18, wherein said control system is further configured to reset the monitored distance and repeat the monitoring, determining and signaling steps when the predetermined amount of lubricant is dispensed at the lubrication point of the one motion component.

22. The machine tool lubrication system according to claim 18, wherein the first threshold value and the predetermined amount of lubricant are user defined.

23. The machine tool lubrication system according to claim 18, wherein the travel of the one motion component includes movement controlled by a user program.

24. The machine tool lubrication system according to claim 23, wherein the travel of the one motion component further includes movement controlled by real time user input.

* * * * *